May 17, 1938. M. S. CURTIS 2,118,023
MACHINE TOOL
Original Filed Feb. 9, 1931 6 Sheets-Sheet 4

INVENTOR
Myron S. Curtis
BY
Chas. J. Williamson
ATTORNEY

May 17, 1938.  M. S. CURTIS  2,118,023
MACHINE TOOL
Original Filed Feb. 9, 1931   6 Sheets-Sheet 6

Patented May 17, 1938

2,118,023

UNITED STATES PATENT OFFICE 2,118,023

MACHINE TOOL

Myron S. Curtis, Pawtucket, R. I., assignor to William Wallace Potter, Pawtucket, R. I.

Original application February 9, 1931, Serial No. 514,667. Divided and this application November 30, 1937, Serial No. 177,380

17 Claims. (Cl. 82—2)

The present invention relates to improvements in machine-tools for turning, boring and the like and is a division of copending application Ser. No. 514,667, filed February 9, 1931.

In my specification as an exemplification of my invention, I describe a machine for turning work on centers, but my invention is applicable to other machines, for example those in which work is held in a chuck. I do not limit myself to the center turning type of machine. Among the features of my invention and the advantages which I obtain by my improvements are:

1. Minimum of floor space and ease of operation, by virtue of the vertical construction employed;

2. Rigidity and strength of construction, and cheapness of manufacture and ease of alignment by using bars to extend between and connect the stationary members to constitute frame members and at the same time make them serve as guides or ways for the slidable machine members;

3. Ease of adaptation to a mechanical feed machine or to a hydraulic feed machine;

4. Supporting and operating a tailstock, whereby the work is more rigidly and securely held than usual, and the tailstock center is conveniently moved and clamped;

5. Construction of slides and slide base (or carriage) whereby one set of slides may be conveniently substituted for another;

6. Construction whereby the capacity of the machine may be altered by simply changing the length of the supporting bars;

7. Slide operation, by face cams, so that the working angle of the cam is kept to the minimum and the action between the cam and cam roll takes place at the nearest possible position to the point of action of the tool, and with the minimum of distance between the point of application of the cam to the cam roll stud and the bearing of the cam roll stud in the slide, thereby doing away with backlash, spring, etc., which are detrimental to the operation of a machine tool;

8. Counterbalancing a movable slide, by hydraulic or fluid means; and

9. Operation of tailstock center by hydraulic means.

My invention consists in whatever is described by or is included within the terms or scope of the appended claims.

The machine as illustrated has two units, as in the copending application Ser. No. 514,667,— that is two carriages 23, one on the right hand side and the other on the left hand side of the machine, each having a tool slide 218 mounted thereon and each having a separate and necessary operating mechanism; but as the units are alike in construction and functions, although independent of each other, I shall describe the right hand unit only, and like numbers refer to like parts of the two units.

General construction

Base 10 has secured to and extending upward therefrom, four parallel posts or bars 11 and 12, in two pairs, each firmly held in bearings in bottom and top of base 10, in a manner fully disclosed in copending application, aforesaid, and serve as the main support and guide bars. These bars 11 and 12 extend upward to the feed plate 16, where they are firmly held and clamped by bearings 17. By employing bars of different length, the height of the machine and, therefore, its capacity may be easily altered. Preferably, the bars are round in cross section.

Figure 3:
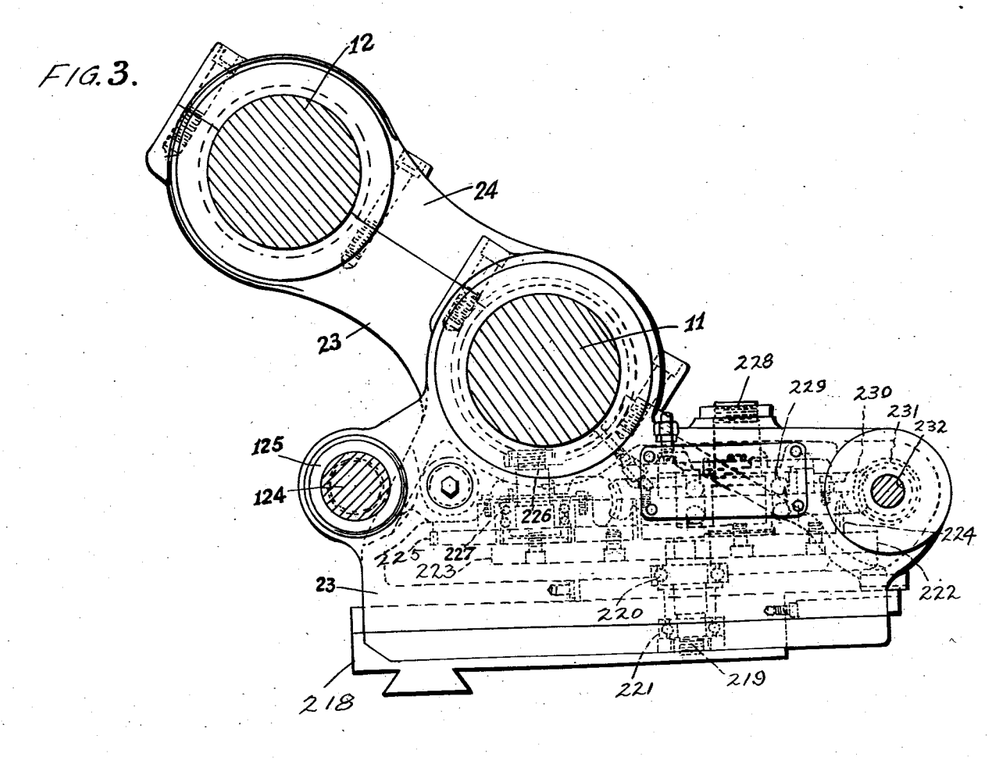
Figure 3 is a plan view of Fig. 2.

Slidably on these bars 11 and 12 is tailstock support or carriage 18 which may be adjusted to any desired position thereon and, when located in the desired position, may be securely held in place by clamping means 20. Also carriages 23 (Fig. 3) may be slidably mounted on each pair of bars 11 and 12, respectively. Each carriage 23 is made with a removable cap 24 (see Fig. 3) so that they may be easily and conveniently attached and removed.

The base 10 contains the spindle operating mechanism; the feed plate 16 supports the feed operating mechanism and the tailstock support 18 carries the tailstock 56.

Base construction and spindle drive

Base 10 is formed with a rim or lip 25, which forms a container for chips, the bottom of which is so sloped that the chips tend to slide down into a suitable collection pan.

Suitably mounted in the base 10 and parallel with the bars 11, is a vertical rotary spindle 28, which may be provided with any type of workpiece engaging element, but for the purpose of the present disclosure a center 28a is shown.

The manner of mounting and driving the spindle may be of any suitable kind, but one way of doing so is illustrated and described in the copending application, aforesaid.

Tailstock operation

Figure 1:
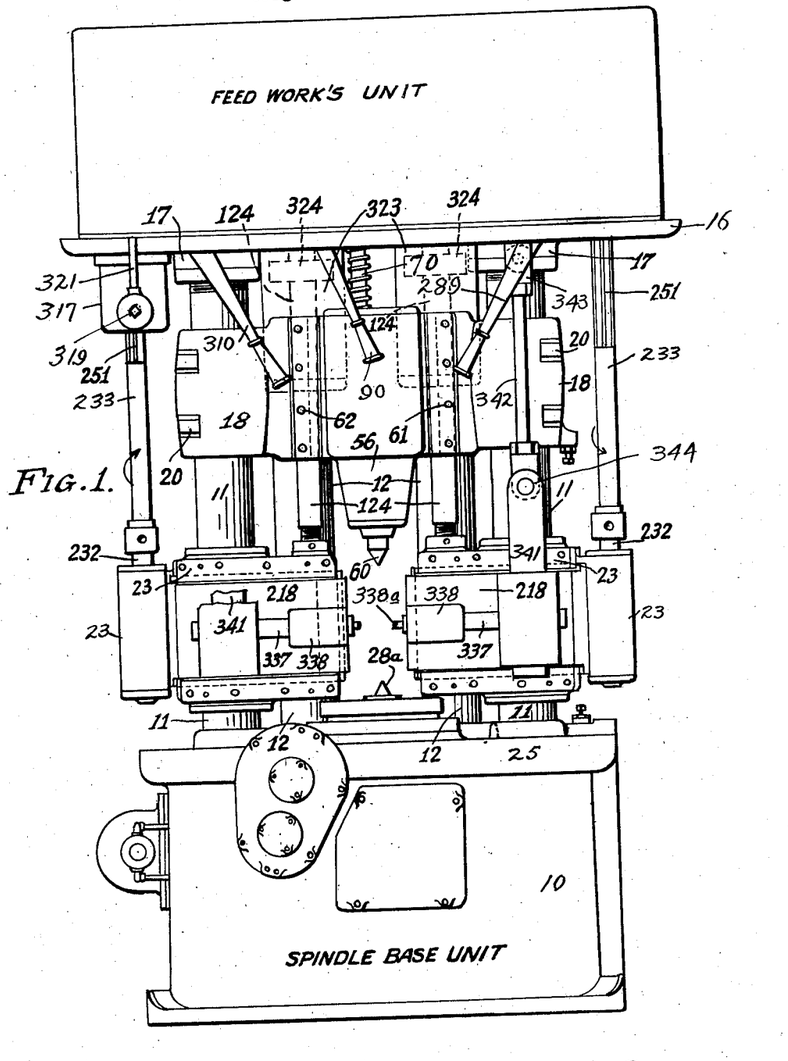
Figure 1 is a front elevation of the machine.

Slidably mounted on guide-ways 61 and 62 in tailstock support 10, is a tailstock body 56 (Fig. 1) which may be of the construction disclosed in the copending application, aforesaid, and operated by hydraulic servo-motor in the feed-works unit. The tailstock is shown as having a center 60 but may carry a tool or other work engaging element.

Figures 6, 9, 10, 11, 12:
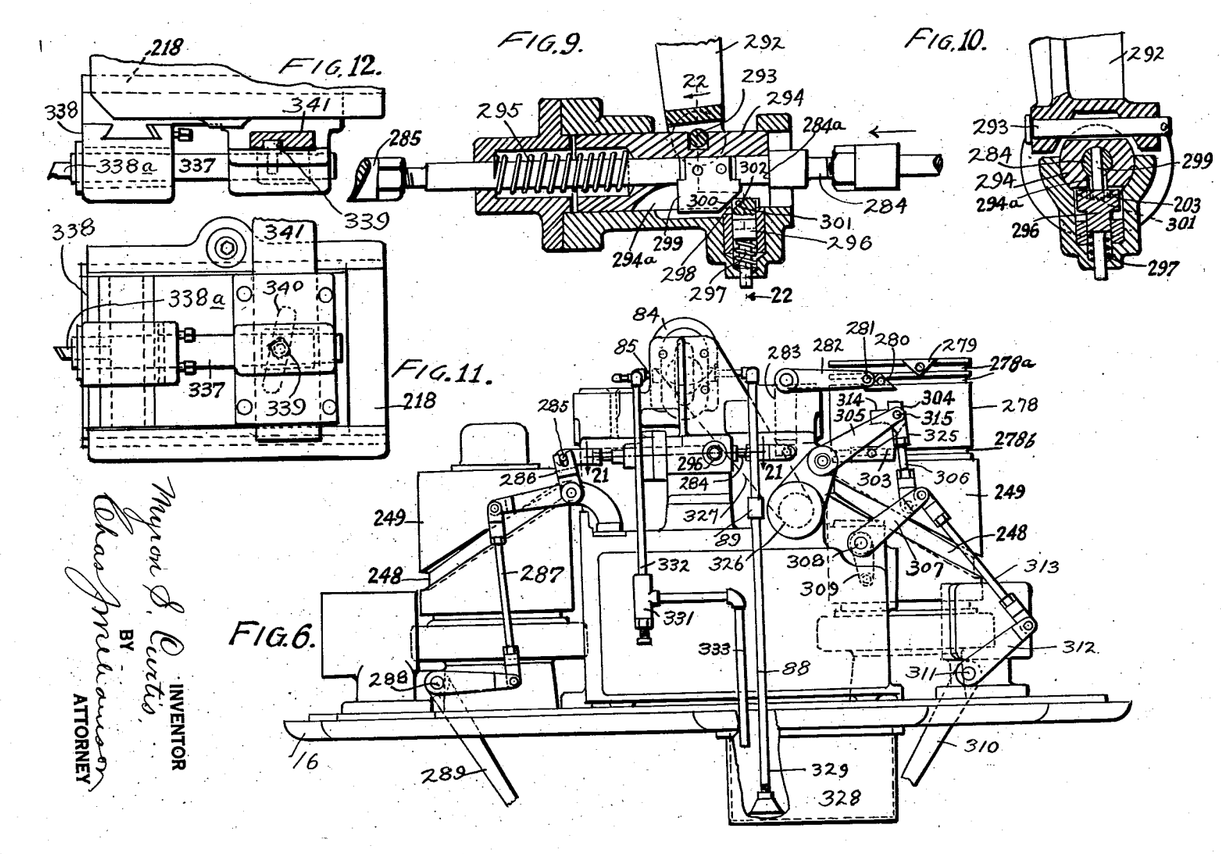
Figure 6 is a rear elevation of Fig. 4.
Figure 9 is a horizontal cross-section on the line 21—21 of Fig. 6.
Figure 10 is a cross section approximately on the line 22—22 of Fig. 9.
Figure 11 is a front view, enlarged, of a forming tool shown on Fig. 1.
Figure 12 is a plan view of Fig. 11.

The tailstock 56 is suspended from or connected to a rod 70 (Figs. 1 and 4) which extends through feed-plate 16 into a cylinder 82, where it has a piston 81 fixed thereto. Cylinder 82 receives fluid either from an outside source or from pump 84 (Figs. 4 and 6) through pipe 85, T 83, pilot valve casing 82a; and the exhaust from the cylinder is delivered through pipe 87 through T 89, either to a drain (not shown) or back to inlet pipe 88 (Fig. 6).

Piston 81, and through it rod 70 and tailstock body 56, are controlled in movement by hand lever 90, which operates a pilot valve 92a in a valve casing 82a on cylinder 82 (Figs. 4 and 7) as follows: An extension 91 on hand lever 90 is connected with valve rod 92 so that movement of the hand lever reciprocates the valve rod 92 and the pilot valve 92a. With the valve 92a in the upper position shown, fluid enters the valve casing through pipe 83 and port 93 and passes to port 94 which is connected by port 95 with the upper end of the cylinder 82 and acts on piston 81 to force it down. The fluid on the underside of piston 81 is forced out through port 95a to port 96 where it passes by the valve to port 97 and lifting poppet valve 98 against the pressure of adjustable spring 99, escapes into exhaust port 87 through port 101.

Figures 4, 7, 8:
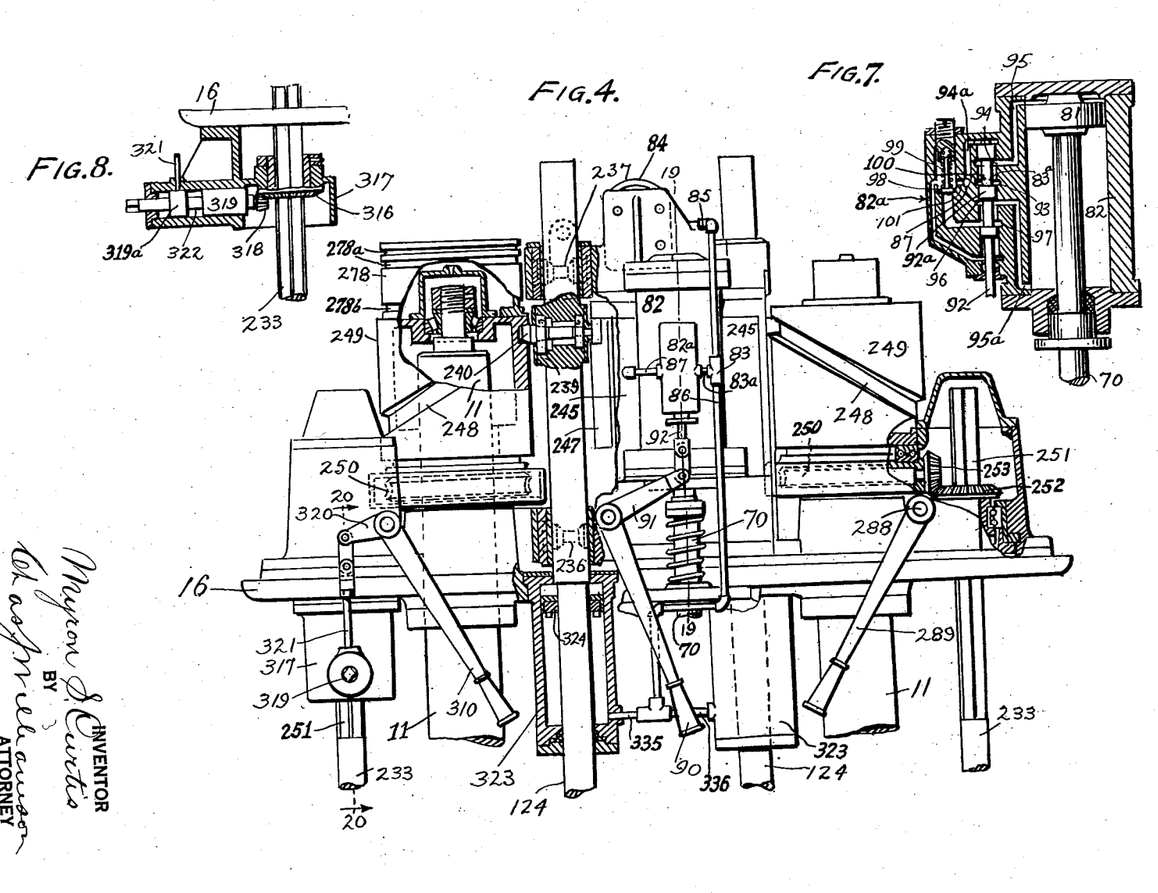
Figure 4 is a front elevation, partially in section, of the feed-plate and feed-works.
Figure 7 is a cross-section on the line 19—19 of Fig. 4 showing the valve mechanism and servo-motor for the tailstock.
Figure 8 is a cross section on the line 20—20 of Fig. 4 showing the construction of the safety hand motion.

When valve rod 92 is pulled down by means of hand lever 90, fluid enters through port 93, passes to port 96 and thence to the underside of piston 81 by means of port 95a, the fluid on top of piston 81 being displaced through ports 95, 94 and passage 94a and port 100 to exhaust pipe 87.

It will be noted that in the upward movement of piston 81, the exhaust flows freely to pipe 87, whereas in its downward movement it is necessary for the exhaust to lift poppet valve 98. The reason for this is three-fold: First, if the fluid were free to exhaust from the under side of the piston when the pressure was shut off from the pipe 83 for any reason, the weight of the tailstock body would cause the tailstock and piston to drop; spring 99 is therefore loaded sufficiently to cause valve 98 to maintain a sufficient back pressure against piston 81 to hold the tailstock up when there is no pressure in the line 83. Second, if there were no back pressure on the under side of the piston, immediately that pressure was applied to the top of the piston, the tailstock body would drop rapidly and out of control. Third, it is desirable to have more force available to retract the tailstock center than to advance it. Due to the area of the piston rod 70 there is more working area on piston 81 to push it down than to push it up. I remedy this difficulty by applying a back pressure to the bottom side of piston 81 by means of controlled poppet valve 98, so that there is extra back pressure on the bottom of the piston 81 when the piston is being forced down.

Mechanical slide construction

Figure 2:
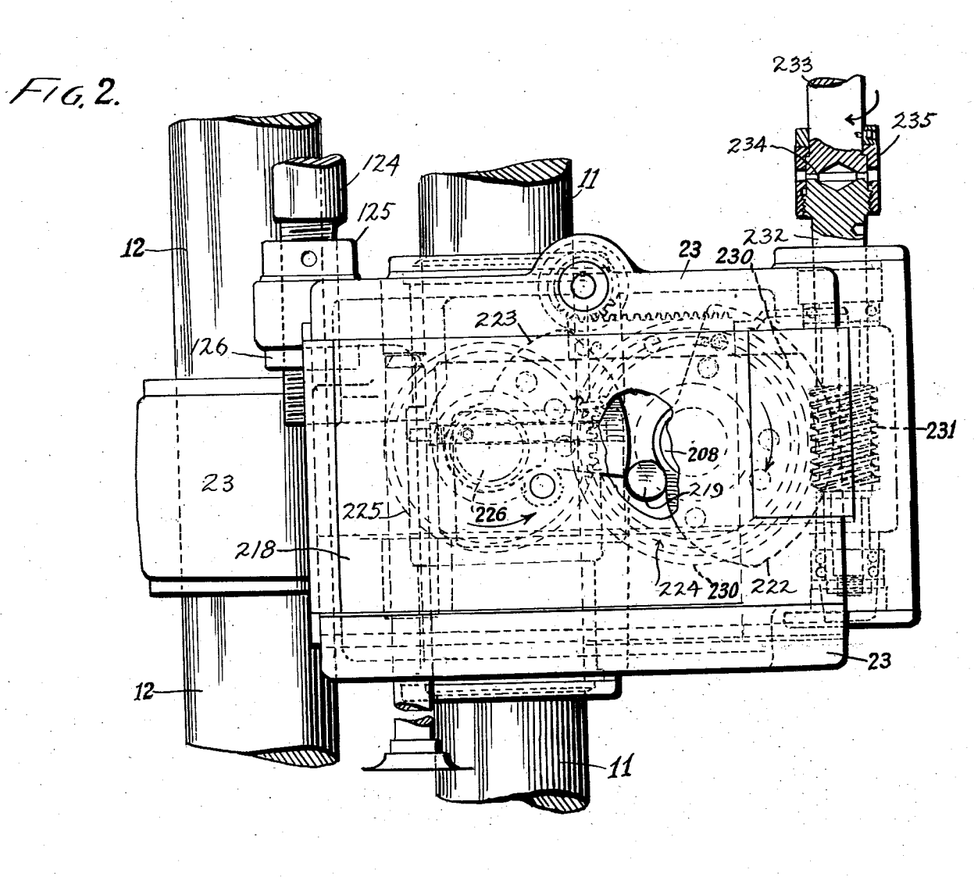
Figure 2 is a front elevation of the right hand mechanically operated slide of Fig. 1.

The slide units of this invention comprise the carriages 23, previously referred to, (Figs. 1, 2 and 3) and only the right hand slide units will be described as the other is the same. The right hand unit, therefore, comprises a carriage 23 slidably mounted on bars 11 and 12 by means of cap 24 in the same way as in the aforesaid copending application.

Slidably mounted on the carriage 23, in suitable ways, is a cross slide 218 carrying a cam roll stud 219 mounted in anti-friction bearings 220 and 221. The cam roll stud lies in the path of feed cam 222, and return cam 223, respectively, fastened to intermeshing gears 224 and 225. These gears have an equal number of teeth and revolve, normally, in the direction shown by the arrow (Fig. 2) and cams 222 and 223 are so formed and timed together, that rotation of the gears in this direction causes the slide 218 to be fed forward by cam 222, and then returned by cam 223 at a rate and condition of feed determined by the contour of the cam. Gear 224 is mounted on the carriage on stud 226 in bearing 227, and gear 224 is mounted on stud 228 by bearing 229 in the carriage and has bolted to its peripheral portion worm gear 230 meshing with worm 231 on worm shaft 232. Worm shaft 232 is connected with shaft 233 by coupling sleeve 235, the ends of the shafts 232 and 233 having intermeshing teeth to insure a positive connection between the two. By disconnecting coupling sleeve 235 the angular relation between shafts 232 and 233 may be easily and conveniently altered, and the shafts re-coupled together, in the altered relation. In this manner, cams 222 and 223 receive motion from shaft 233 whose source of power is hereinafter described.

Mechanical slide operation

Carriage 23, which performs the same functions as the carriage 22 in the previously mentioned copending application, is connected to and moved up and down by rod 124 through the medium of adjustment collars 125 and 126. The upper end of rod 124 passes up through feed plate 16 (Figs. 4 and 5) in which it is supported by pairs of rollers 236 and 237, one pair above the other as shown in Fig. 4, the ends of which are supported by anti-friction bearings 238 (Fig. 5) and the centers of which are machined to conform to the radius of rod 124. Between bearings 236 and 237, rod 124 has an enlarged section 239 in which is mounted, on anti-friction bearings, cam roller 240 and which also rotatably supports anti-friction bearings 241 and 242 which bear on plates 243 and 244, respectively, in stationary supporting bracket 245.

Cam roll 240 has mounted on it an anti-friction roller 246 which bears in a groove in block 247 also mounted in bracket 245 and extending longitudinally with respect to the movement of said rod 124. Bearings 241, 242 and 246, therefore, form a perfect support for rod 124 against thrust generated by action of the cam on cam roll 240. Cam roll 240 co-acts with cam path 248 in cam drum 249 which is rotatably mounted on the upper end of bar 11 and which is rotated by worm gear 250 fixed to the cam drum. As cam path 248 may be of any desired contour, rotation of drum 249 will cause rod 124 to move up and down and thus impart feeding motion to carriage 23.

Shaft 233 (see Figs. 2, 4 and 5) through which cross slide cams 222 and 223 are rotated as hereinbefore described, is castellated on its upper end 251, and is slidable in bevel gear 252 as carriage 23 moves up and down. Said bevel gear is broached to fit the castellations on shaft 233 and thus revolution of gear 252 causes shaft 233 to rotate. Gear 252 is driven by pinion 253 on shaft 254 which also has keyed to it worm 255 which meshes with and drives worm gear 250 on cam drum 249, and carriage cam drum 249 and cross slide cams 222 and 223 are thus synchronously rotated from motor 259. Shaft 254 is driven by shaft 256 through bevel gears 257 and 258 and thus the feed cams receive their feeding motion from shaft 256. Shaft 256 has two motions, a fast constant speed motion for idle movements and a slow variable speed motion for feeding, which motions are derived as follows:

Motor 259 drives worm 260 through coupling 261 and thus drives worm gear 262 which is loose on shaft 263 but which can be clutched to it by friction clutch 264. When so clutched it drives shaft 263, at a constant speed. Removably keyed to the end of shaft 263 is change gear 265 meshing with change gear 266 removably keyed to the end of shaft 267 to the other end of which is removably keyed change gear 268 meshing with change gear 269 removably keyed to shaft 270. By these change gears the ratio of rotation of shaft 270 to shaft 263 may be varied. Keyed to shaft 270 is pinion 272 which meshes with roller ratchet gear 273 on shaft 256, which ratchet gear drives shaft 256 or allows said shaft to run away from it in a way well known in the art and when driving shaft 256 imparts a relatively low speed to it for feeding purposes. High speed for idle movements may be given shaft 256 by means of slidable gear 274 which may be shifted to clutch to or declutch from plate 275 keyed fast to shaft 256, and when so clutched it imparts a relatively high, constant speed to shaft 256 as it is driven at a constant speed from shaft 263 by gear 276. Gears 274 and 276, in reality, mesh with each other, but in the drawings their centers are shown out of position for descriptive purposes, as indicated by the dotted line $x$.

*Mechanical slide control*

Clutch 277 which controls the feed and fast idle movements and clutch 264 which controls stop movements are operated as follows:

Preferably one of the cam drums 249 has a cylindrical extension 278 (see Figs. 4 and 6) provided with circumferential slots 278a, to the upper two of which are removably fixed dogs 279 and 280 which, by means of a pin 281 on a rock lever 282 and arm 283, operate push rod 284 (Figs. 6 and 9). Push rod 284 may also be operated by lever 289 on shaft 288 through the lever and link connections 285, 286, 287 and 288. Thus high constant speed clutch 277 is operated by push rod 284 through clutch yoke 290, stud 291, lever 292, pin 293 and sleeve 294 (Figs. 5 and 9) as follows:

Dog 279 acting on pin 281 pushes rod 284 through the connections already mentioned, pushes it to the left as shown by the arrow in Fig. 9; and rod 284 by a shoulder 284a pushes sleeve 294 to the left, thus positively moving lever 292 and pulling clutch 277 out of mesh with clutch plate 275 which is fixed to shaft 256, thereby permitting shaft 256 to be driven through the roller ratchet gear 273 from the motor 257 for slow speed work operations. Movement of sleeve 294 to the left, compresses spring 295 and this movement to the left continues until plunger 296 is forced by spring 297 into notch 298 in sleeve 294, thus locking sleeve or bushing 294 in place against the pressure of spring 295, as shown in Fig. 9.

Action of dog 280 on pin 281 moves rod 284 to the right (Figs. 6 and 9) which rod is freely slidable in this direction in sleeve or bushing 294 in the direction contrary to the arrow. The sleeve 294 has an elongated slot 294a to receive finger 299 pinned to rod 284. This finger has a corner portion 300 beveled to coact with the bevel 301 on plunger 296 and thus forces plunger 296 down against pressure of spring 297 until it is out of engagement with the slot or notch 298 in sleeve 294 at which time spring 295 will force sleeve 294 quickly to the right (or contrary to the direction of the arrow in Fig. 9) and thus through lever 292 will throw clutch 277 into mesh with clutch 275. Shaft 256 will now be driven at a fast constant speed and will run away from roller ratchet gear 273. By referring to Fig. 9, it will be noted that plunger 296 is beveled at 301 where it engages with finger 299, is squared at 302 where it engages with slot 298 in bushing 294 as mentioned before. The same operations of clutch 277 may be accomplished by hand by means of hand lever 289 previously described.

Figure 5:
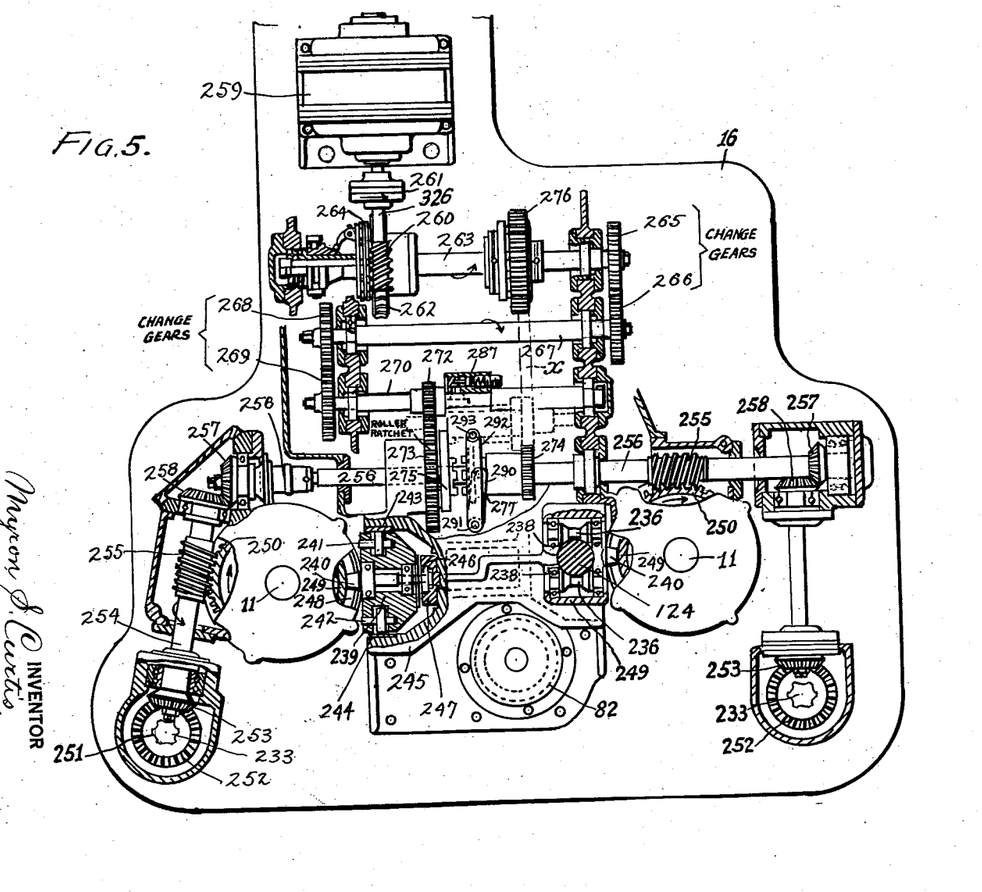
Figure 5 is a plan view, partially in section, of the feed plate and feed works.

Fastened to lower slot 278b on extension 278 of cam drum 249 is dog 303 (Fig. 6) which acts on flip finger 304 pivoted on lever 305 at 315, and by rod 306 oscillates lever 307 keyed to shaft 308, to the other end of which is keyed yoke 309 which operates stop clutch 264 (Figs. 5 and 6). Movement of lever 305 is effected automatically by dog 303 in only one direction which is to throw out clutch 264 and said clutch is thrown in by hand lever 310 on shaft 311 through link 312 and connecting rod 313 which connects with lever 307. As drum 278 is thus brought to a stop immediately clutch 264 is disengaged, dog 303 will be in line with finger 304, but weighted end 314 of said finger causes it to oscillate on pin 315 and to move out of the path of dog 303 and allow the clutch to be thrown in by hand by means of lever 310. As all connections between clutch yoke 309 and hand lever 310 are positive, clutch 264 may also be thrown out of mesh by hand lever 310.

For setting tools or other purposes the slides may be operated by hand as follows:

On at least one of the slide shafts 233 is provided a bevel gear 316 which is broached to fit the castellations on shaft 233, and is held fixed against longitudinal movement in bracket 317, bolted to feed plate 16 (see Fig. 8). Also located in bracket 317 is bevel pinion 318 on stud 319 in a suitable housing or bearing in bracket 317, the end of which is squared to receive a hand crank. Stop hand lever 310 has an extension 320 (see Fig. 4) to which is fastened a detent rod 321 slidable in the bracket 317 at substantially right angles to the sliding movement of the stud 319. This connection is such as can be seen from Fig. 4, that when hand lever 310 is in the position that clutch 264 is disengaged, rod 321 will be slid to withdraw its free end from the notch or recess 322 of the stud 319, thus clearing the pinion stud 319 and allowing it to be slid inwardly so that the pinion 318 will mesh with gear 316. When pinion 318 is in mesh with gear 316 hand lever 310 cannot be moved to engage clutch 264 because the enlargement 319a will prevent movement of the hand lever 310 in the direction to engage the clutch 264. When pinion 318 is pulled out of mesh, however, rod 321 can drop into groove 322 and clutch 264 may be engaged. When it is thus engaged, as rod 321 is co-acting with groove 322, pinion 318 cannot be meshed with gear 316. It is, therefore, impossible for both power and hand motion to be applied to shaft 233 at the same time.

Carriage counterbalancing

Fastened to the underside of feed plate 16 are cylinders 323 (Fig. 4) one for each rod 124 within each cylinder 323 and fastened to each rod is a piston 324. A constant pressure of fluid is maintained against the bottom of said piston, sufficient to counterbalance the weight of carriage 23 and its appurtenances, either from an outside source such as an accumulator or compressed air, or from fluid pump 84 (Fig. 6) which is driven from worm shaft 326 through chain 327. Pump 84 sucks fluid from tank 328 through inlet pipe 329 and delivers same under pressure to pipe 85, this pressure being constantly maintained by adjustable relief valve 331 connected with pipe 85 by pipe 332, the excess fluid flowing back into tank 328 through pipe 333. The delivery pipe 85 is connected with cylinders 323 through pipes 86, 335 and 336 and also may furnish fluid to operate the tailstock through branch pipe 83a as previously described.

Forming tool operation

If it is desired to turn at an angle to the center line of work, or to form turn, this may be done. Fastened to cross slide 218 is a tool block 338 (Figs. 11 and 12) in which is slidable, but not rotatable, bar 337 which is adapted to carry tool or tools 338a and which has fixed near the other end of it a cam follower 339 which co-acts with cam 340 in cam plate 341, so that movement of said cam plate relative to the slide 218 causes movement of bar 337 relative to slide 218. Cam plate 341 is held against longitudinal movement by bar 342 fixed to plate 16 through swivel joint 343 (see Fig. 1) and is fixed to cam plate 341 through swivel joint 344. It will be seen, therefore, that due to the distance between slide 218 and plate 16 movement of slide 218 inwards will cause practically no relative movement of car plate 341 to slide 218, but movement of carriage 23 either up or down will cause a relative movement between cam plate 341 and slide 218 and thus tool 338a will follow the form of the cam 340 on plate 341. By this construction I am enabled to feed tool 338 to the work by movement of slide 218, then by stopping slide 218 and moving carriage 23 to cause tool 338a to turn any desired form; then by stopping carriage 23 and returning slide 218 to pull tool 338a back from the work; then by stopping slide 218 and returning carriage 23, to return both slides to the original starting point—thus preventing any marking of the work by tool 338a on its return stroke. It is to be understood, however, that the tool block 338 and its appurtenances, including the cam plate 341 may be substituted for the tool block 107 of the embodiment disclosed in the co-pending application, aforesaid.

From the foregoing the construction and operation of the present invention will be manifest, but it is to be understood that the invention is not limited to the exact construction and instrumentalities shown and described nor to the center-turning lathe shown, as it may be embodied in other forms of machine-tools and the construction may be modified or varied within the terms of the appended claims.

That which is claimed is:

1. A machine-tool comprising two spaced apart units which, respectively, impart motion to the work piece and travel to the tool relative to the work piece, one of said units including means for reciprocating the work performing instrumentalities thereof, fluid pressure means for at least certain of said instrumentalities to resist the movement of the latter in at least one of its directions of movement and including a constant pressure, and means to maintain said pressure at predetermined amounts.

2. In a machine-tool comprising two vertically spaced apart units which, respectively, rotate the work piece and travel to the tool relative to the work piece, and further comprises a vertically movable carriage operable by mechanism in the upper of said units, means for raising and lowering said carriage, fluid pressure counterbalance means for said carriage and connected to the upper unit and including a vertical cylinder and piston therein, and means for supplying counterbalancing pressure against the bottom of said piston in predetermined amounts.

3. In a machine-tool having a reciprocating slide, a reciprocating rod connected therewith, a cam follower projecting from and mounted on said rod, a member having a cam path thereon with which said follower cooperates, whereby said rod is reciprocated, means slidably supporting said rod including a bracket with which said rod has slidable bearing contact adjacent said follower at points opposite the follower and on both sides thereof, whereby side thrust from said cam is resisted.

4. In a machine-tool having a reciprocating slide, a reciprocating rod connected therewith, a cam follower projecting from and mounted on said rod, a member having a cam path thereon with which said follower cooperates, whereby said rod is reciprocated, means slidably supporting said rod including a bracket, said rod having a three sided bearing portion longitudinally slidable in said bracket and in contact with complemental bearing portion of said bracket.

5. In a machine-tool having a slide, means to impart feed and fast motions to said slide including a transmission with a clutch to connect and disconnect one of said motions, a reciprocating rod operatively connected with the clutch to operate the latter in one direction of its movement, a cam for reciprocating on said rod when operating said clutch, a spring placed under stress by the cam movement of said rod, and means for holding the spring under tension and means operated by the movement of said rod when moved in an opposite direction to release said spring holding means whereby the stress on the spring will be relieved and the clutch reversely actuated thereby.

6. A machine-tool having a slide, means to impart feed and fast motion to said slide including a transmission with a clutch, a clutch operating member, a reciprocatable cam actuated rod having a connection with said clutch operating member for moving said member in one direction, a spring placed under stress by the cam movement of the rod in one direction, a latch for holding said spring under said stress, said rod having a loose connection with the clutch operated member whereby said rod may be moved in an opposite direction for a distance without relieving the stress on said spring, and means on said rod and operated by said rod to release said latch means when said rod is moved in said opposite direction whereby the stress on said spring will be relieved and the clutch reversely actuated.

7. In a mechanism for machine tools as set forth in claim 6 further characterized by a manually operated connection for said rod whereby the latter may be operated either by said cam or manually.

8. The combination with a machine member to be moved quickly and operating mechanism therefor, comprising a tube, a rod slidable in said tube and acting to move the tube longitudinally in one direction, a spring placed under tension by the longitudinal movement of said tube in one direction, a latch for holding the tube against the pressure of said spring, and means on said rod for releasing said latch when moved in the other direction and allowing the spring to impart quick longitudinal movement to the tube.

9. A machine-tool having a to and fro movable tool carrier, a support for said carrier means to reciprocate the carrier comprising oppositely acting cams mounted on said support and between said support and said carrier, a cam follower on the carrier and interposed between said cams, and means for operating said cams in unison.

10. A machine-tool having a reciprocating carriage, a movable slide mounted on said carriage for movement relative thereto, and means to operate said slide consisting of oppositely acting face cams on the carriage and a stud on the slide interposed between the cams and acted upon directly by the cams, and means operating said cams.

11. A machine tool as in claim 9 in which the cams each have a gear portion meshing with one another whereby the cams are oppositely rotated.

12. In a machine-tool, a rotatable spindle, a carriage movable toward and away from said spindle, a slide mounted on said carriage for to and fro movement, a prime mover, means actuated by the prime mover for operating said carriage and including a cam drum and a continuous cam path therein, means actuated by the prime mover for operating said slide, a rod connected with said carriage and having a follower thereon extending into said cam path whereby the carriage may be reciprocated, a mechanism on the carriage interposed between said slide and said slide drive connection for reciprocating said slide, said carriage and slide operating means including operable regulating means for varying the rate of movement of said carriage and slide, and dogs on said drum for actuating said last mentioned means for controlling the rate of movement of said slide.

13. In a machine tool as a rotatable spindle, a tool slide mounted on said machine for to and fro movement, a prime mover, means actuated by the prime mover for operating said slide and at different speeds whereby said slide may be reciprocated, a regulating mechanism for varying the speed of movement of said slide, and dog cams for actuating said mechanism, manually operated control means for connecting and disconnecting the prime mover from said slide operating means, manually operated means connected with said slide operating means whereby the latter may be actuated manually, and interlocking means between the manual prime mover control means and the manual slide operating means whereby one is locked out of operation when the other is in operation.

14. In a machine-tool, a rotatable spindle, a plurality of tool carrying members slidably movable toward and away from said spindle, a prime mover, means actuated by the prime mover for operating said members and including cam drum means positively connected to each of said members for reciprocating the latter, said means for operating said members including operable means for disconnecting said prime mover from said member reciprocating means, and dogs on said cam drum means for actuating said disconnecting means.

15. In a machine tool as set forth in claim 14 further characterized by a manually operated means connected to the slide disconnecting means whereby feed of the slide may be manually disconnected and connected.

16. In a machine tool as set forth in claim 14 further characterized by manually operated control means for connecting and disconnecting the prime mover from said member operating means, manually operated means connected with said member operating means whereby the latter may be actuated manually, and interlocking means between the manual prime mover control means and the manual member operating means whereby one is locked out of operation when the other is in operation.

17. The combination with a machine-tool member to be moved quickly and operating mechanism therefor, comprising a movable member, an element slidable with respect to said member and acting to move the latter in one direction, a spring placed under tension by the movement of said member in one direction, a latch for holding said member against the pressure of said spring, and means on said element for releasing said latch when the element is moved in the other direction and thus allowing the spring to impart a quick reverse movement to said member.

MYRON S. CURTIS.